US 8,122,124 B1

(12) United States Patent
Baumback et al.

(10) Patent No.: US 8,122,124 B1
(45) Date of Patent: Feb. 21, 2012

(54) MONITORING PERFORMANCE AND OPERATION OF DATA EXCHANGES

(75) Inventors: Mark S. Baumback, Seattle, WA (US); David William Bettis, Seattle, WA (US); Jonathan A. Jenkins, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 531 days.

(21) Appl. No.: 12/240,583

(22) Filed: Sep. 29, 2008

(51) Int. Cl.
*G06F 15/173* (2006.01)

(52) U.S. Cl. .................. 709/224; 709/217; 709/238

(58) Field of Classification Search .............. 709/224, 709/219, 201, 200, 217, 238; 370/234
See application file for complete search history.

(56) References Cited

U.S. PATENT DOCUMENTS

| 5,649,185 | A | 7/1997 | Antognini et al. |
| 5,664,106 | A | 9/1997 | Caccavale |
| 5,819,033 | A | 10/1998 | Caccavale |
| 6,185,598 | B1 * | 2/2001 | Farber et al. ............... 709/200 |
| 6,438,592 | B1 * | 8/2002 | Killian ........................ 709/224 |
| 6,473,804 | B1 | 10/2002 | Kaiser et al. |
| 6,553,419 | B1 | 4/2003 | Ram |
| 6,633,324 | B2 | 10/2003 | Stephens, Jr. |
| 6,698,013 | B1 | 2/2004 | Bertero et al. |
| 6,978,418 | B1 | 12/2005 | Bain et al. |
| 7,009,943 | B2 | 3/2006 | O'Neil |
| 7,023,465 | B2 | 4/2006 | Stephens, Jr. |
| 7,065,496 | B2 | 6/2006 | Subbloie et al. |
| 7,085,825 | B1 | 8/2006 | Pishevar et al. |
| 7,107,273 | B2 | 9/2006 | Ohata et al. |
| 7,120,871 | B1 | 10/2006 | Harrington |
| 7,120,874 | B2 | 10/2006 | Shah et al. |
| 7,269,657 | B1 | 9/2007 | Alexander et al. |
| 7,343,399 | B2 | 3/2008 | Hayball et al. |
| 7,581,224 | B2 | 8/2009 | Romero |
| 7,685,270 | B1 | 3/2010 | Vermeulen et al. |
| 7,698,418 | B2 * | 4/2010 | Shimada et al. .............. 709/224 |
| 7,748,005 | B2 | 6/2010 | Romero et al. |
| 7,752,301 | B1 | 7/2010 | Maiocco et al. |
| 7,756,032 | B2 * | 7/2010 | Feick et al. .................. 370/234 |
| 7,865,594 | B1 | 1/2011 | Baumback et al. |
| 7,925,782 | B2 | 4/2011 | Sivasubramanian et al. |
| 7,937,456 | B2 | 5/2011 | Mcgrath |
| 7,961,736 | B2 | 6/2011 | Ayyagari |

(Continued)

*Primary Examiner* — Jungwon Chang
(74) *Attorney, Agent, or Firm* — Knobbe, Martens, Olson & Bear LLP (57) ABSTRACT

A system and method for monitoring the performance associated with fulfilling resource requests are provided. A client computing component associated with a client computing device identifies an original resource request and associates a record identifier with the original resource request. The client computing component transmits the original resource request and the associated record identifier to a performance measurement component. The client computing component also determines performance data associated with processing the original resource request. In response to the transmission from the client computing component, the performance measurement component further transmits the original resource request and also monitors performance associated with processing the original resource request as well as any embedded resource requests included in a response to the original resource request. The performance measurement component and the client computing component each transmit the determined performance data associated with the record identifier to a processing component for further analysis. Aspects of systems and methods for monitoring the operation and performance of networked devices are provided. In some embodiments, performance measurement components are provided for network client and/or network content providers. Performance measurement components may transmit performance data to a metric processing component.

48 Claims, 7 Drawing Sheets

U.S. PATENT DOCUMENTS

| | | |
|---|---|---|
| 7,962,597 B2 | 6/2011 | Richardson et al. |
| 8,051,166 B1 | 11/2011 | Baumback et al. |
| 2002/0112049 A1* | 8/2002 | Elnozahy et al. ............. 709/224 |
| 2002/0116491 A1 | 8/2002 | Boyd et al. |
| 2002/0138443 A1 | 9/2002 | Schran et al. |
| 2002/0150276 A1 | 10/2002 | Chang |
| 2002/0194382 A1 | 12/2002 | Kausik et al. |
| 2003/0005111 A1* | 1/2003 | Allan ............................ 709/224 |
| 2003/0221000 A1 | 11/2003 | Cherkasova et al. |
| 2004/0049579 A1 | 3/2004 | Ims et al. |
| 2004/0064293 A1 | 4/2004 | Hamilton et al. |
| 2004/0064558 A1 | 4/2004 | Miyake |
| 2005/0086645 A1 | 4/2005 | Diao et al. |
| 2005/0273507 A1 | 12/2005 | Yan et al. |
| 2006/0209701 A1 | 9/2006 | Zhang et al. |
| 2006/0218304 A1 | 9/2006 | Mukherjee et al. |
| 2006/0251339 A1 | 11/2006 | Gokturk et al. |
| 2006/0282758 A1 | 12/2006 | Simons et al. |
| 2007/0016736 A1 | 1/2007 | Takeda et al. |
| 2007/0245010 A1 | 10/2007 | Arn et al. |
| 2007/0250560 A1* | 10/2007 | Wein et al. .................... 709/201 |
| 2008/0065724 A1 | 3/2008 | Seed et al. |
| 2008/0065745 A1* | 3/2008 | Leighton et al. .............. 709/219 |
| 2008/0086559 A1 | 4/2008 | Davis et al. |
| 2008/0172488 A1 | 7/2008 | Jawahar et al. |
| 2008/0183721 A1 | 7/2008 | Bhogal et al. |
| 2008/0215755 A1 | 9/2008 | Farber et al. |
| 2009/0122714 A1 | 5/2009 | Kato |
| 2009/0248893 A1 | 10/2009 | Richardson et al. |
| 2011/0252143 A1 | 10/2011 | Baumback et al. |

* cited by examiner

MONITORING PERFORMANCE AND OPERATION OF DATA EXCHANGES

BACKGROUND

Generally described, computing devices and communication networks can be utilized to exchange information. In a common application, a computing device can request content from another computing device via a communication network. For example, a user at a personal computing device can utilize a browser application to request a web page from a server computing device via the Internet. In such embodiments, the user computing device can be referred to as a client computing device and the server computing device can be referred to as a content provider.

Content providers are generally motivated to provide requested content to client computing devices often with consideration of efficient transmission of the requested content to the client computing device and/or consideration of a cost associated with the transmission of the content. Additionally, the content requested by the client computing devices may have a number of components, which can require further consideration of latencies associated with delivery of the individual components as well as the originally requested content as a whole.

With reference to an illustrative example, a requested Web page, or original content, may be associated with a number of additional resources, such as images or videos, that are to be displayed with the Web page. In one specific embodiment, the additional resources of the Web page are identified by a number of embedded resource identifiers, such as uniform resource locators ("URLs"). In turn, software on the client computing devices, such as a browser application, typically processes embedded resource identifiers to generate requests for the content. Often the resource identifiers associated with the embedded resource reference a computing device associated with the content provider such that the client computing device would transmit the request for the additional resources to the referenced computing devices. Accordingly, in order to satisfy a content request, the content provider(s) (or any service provider on behalf of the content provider(s)) would provide client computing devices data associated with the Web page and/or data associated with the embedded resources.

Traditionally, a number of methodologies exist which measure the performance associated with the exchange of data such as in the environment described above. For example, some methodologies provide for limited measurement of performance metrics associated with network side processing of a content request. Other methodologies allow for limited measurement of performance metrics associated with a content request as measured from a browser application's perspective.

BRIEF DESCRIPTION OF THE DRAWINGS

Many of the attendant advantages and aspects of the present disclosure will become more readily appreciated as the same become better understood by reference to the following detailed description, when taken in conjunction with the accompanying drawings, wherein.

DETAILED DESCRIPTION

Generally described, the present disclosure is directed to monitoring the performance and processing of data exchanges between client computing devices and server computing devices. Specifically, aspects of the disclosure will be described with regard to monitoring a data exchange involving a request by a client computing device for an original resource including one or more embedded resources. Performance data can then be used to assess performance related to the processing of the client request for the original resource and any embedded resources. Additionally, the processed performance data can be used to support modifications to the original resource and/or embedded resources to improve performance for subsequent client requests for the original resource and/or embedded resources.

Traditionally, network servers can collect latency information associated with a server's processing of a client request for a resource. For example, network servers can measure a time associated with processing an incoming client request, identifying/obtaining the requested resource, and initiating the transmission of the resource responsive to the client request. Additionally, client computing devices can collect latency information associated with the client computing device's initiation of a resource request and receipt of the resource responsive to the request. Aspects of the present disclosure, which will be described further below, are directed to identifying and providing additional information to improve the performance assessment related to the processing of a client request for an original resource and any embedded resources. Although various aspects of the disclosure will be described with regard to illustrative examples and embodiments, one skilled in the art will appreciate that the disclosed embodiments and examples should not be construed as limiting.

Figure 1:
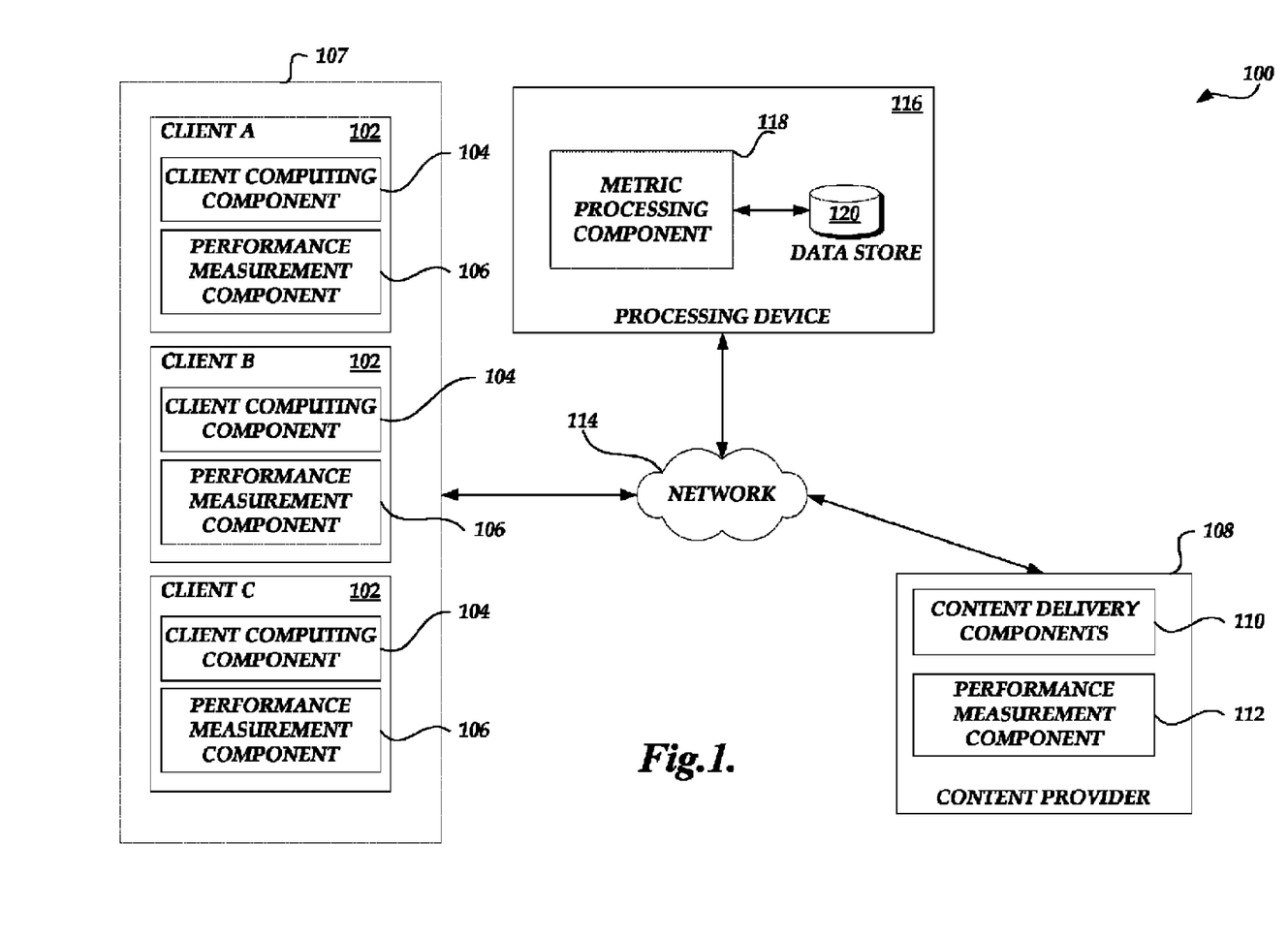
FIG. 1 is a block diagram illustrative of a performance measurement system including a number of client computing devices, a content provider, and a processing device.

FIG. 1 is a block diagram illustrative of a performance measurement system 100 for monitoring the performance and processing of data exchanges. As illustrated in FIG. 1, the performance measurement system 100 includes a number of client computing devices 102 (generally referred to as clients) for requesting content from a content provider. As illustrated in FIG. 1, each client computing device 102 includes a client computing component 104 for requesting content from network resources in the form of an originally requested resource that may include identifiers to one or more embedded resources that need to be requested. As will be described in greater detail below, the client computing component 104 also identifies performance metrics obtained by client computing devices and/or components, such as browser software applications. Additionally, the client computing device 102 includes a performance measurement component 106 that identifies additional performance metrics associated with the client request, such as network level performance data including, for example, timing of receipt of first and last network packets of data for fulfilling the original resource request and each embedded resource request. In one embodiment, the performance measurement component 106 works in conjunction with the client computing component 104 to collect performance metric information such as from an operating system or a data file.

As illustrated in FIG. 1, the client computing component 104 and performance measurement component 106 are executed on each client computing device 102. Alternatively, the client computing component 104 may not be configured, or is otherwise incapable of, obtaining or providing some or all of the performance metric information described herein. In such an embodiment, the client computing component 104 may function with a reduced or limited capacity. In still a further embodiment, the client computing component 104 may function in conjunction with a separate communication software application (e.g., a browser software application) to provide the combined functionality described for the client computing component 104. For example, the client computing component could correspond to a stand alone software application, plugin, script, and the like. Additionally, although each client computing device 102 is illustrated as having a separate performance measurement component 106, in an alternative embodiment, the performance measure component 106 may be shared by one or more client computing devices.

In an illustrative embodiment, the client computing devices 102 can correspond to a wide variety of computing devices including personal computing devices, laptop computing devices, hand-held computing devices, terminal computing devices, mobile devices, wireless devices, various electronic devices and appliances and the like. As also illustrated in FIG. 1, the client computing devices 102 are considered to be logically grouped, as represented generally by client 107, regardless of whether the client computing devices are physically separate and geographically distributed throughout the communication network 114. In this regard, the client computing devices 102 can each communicate directly or indirectly with other computing devices over network 114, such as a wide area network or local network. Additionally, one skilled in the relevant art will appreciate that client 107 can include or otherwise be associated with various additional computing devices/components including, but not limited to, content and resource administrative components, DNS resolvers, scheduling devices/components, and the like.

Each of the client computing devices 102 can accordingly include necessary hardware and software components for establishing communications over the network 114. For example, the client computing devices 102 may include networking components and additional software applications that facilitate communications via the Internet or an intranet. As previously described, the client computing device 102 may include an additional, separate browser software application. The client computing devices 102 can also be associated with, or otherwise include, other computing components, such as proxy applications, for further facilitating communications via the Internet or an intranet. As previously described, the client computing components 104 can each function as a browser software application for requesting content from a network resource. Additionally, in an illustrative embodiment, the performance measurement component 106 of the client computing device 102 can function as a proxy application for managing browser application content requests to the network resource. In other embodiments, the client computing devices 102 may be otherwise associated with an external proxy application, as well as any other additional software applications or software services, used in conjunction with requests for content.

With continued reference to FIG. 1 and as set forth generally above, the performance measurement system 100 can include a content provider 108 in communication with the one or more client computing devices 102 via the communication network 114. The content provider 108 can include a number of content delivery components 110, such as a Web server component and associated storage component corresponding to one or more server computing devices for obtaining and processing requests for content (such as Web pages) from the client computing devices 102. The content provider 108 can further include a performance measurement component 112 for measuring performance metrics, such as a time associated with processing an incoming client request, identifying/obtaining the requested resource, and initiating the transmission of the resource responsive to the client request. One skilled in the relevant art will appreciate that the content provider 108 can include or otherwise be associated with various additional computing resources including, but not limited to, additional computing devices for administration of content and resources, DNS name servers, interfaces for obtaining externally provided content (e.g., advertisements, web services, etc.), and the like. Although the performance measurement system 100 is illustrated in a client-server configuration, one skilled in the relevant art will appreciate that the performance measurement system 100 may be implanted in a peer-to-peer configuration as well.

With yet further continued reference to FIG. 1, the performance measurement system 103 can further include a processing device 116 for collecting and aggregating performance data related to the processing of client requests. The processing device 116 can also be used to assess the collected performance data and to determine if modifications to the original resource and/or embedded resources should be made to improve performance for subsequent client requests for the original resource and/or embedded resources.

As illustrated in FIG. 1, the processing device 116 is in communication with the one or more client computing devices 102 and the content provider 108 via communication network 114. Additionally, as will be further described below, the processing device 116 can include a metric processing component 118 for the collection and aggregation of performance data from the client computing devices 102 and content provider 108, as well as for the assessment of performance data. Specifically, in one embodiment, the client computing components 104 and performance measurement components 106 associated with client computing devices 102 provide performance metric information to the metric processing component 118, while the performance measurement component 112 of the content provider 108 provides performance metric information to the metric processing component 118. The processing device 116 can further include a local data store 120 for storing the received performance data. It will be appreciated by one skilled in the art and others that metric processing component 118 and data store 120 may correspond to multiple devices/components and/or may be distributed.

One skilled in the relevant art will also appreciate that the components and configurations provided in FIG. 1 are illustrative in nature. Accordingly, additional or alternative components and/or configurations, especially regarding additional components, systems and subsystems for facilitating communications may be utilized.

Figure 2:
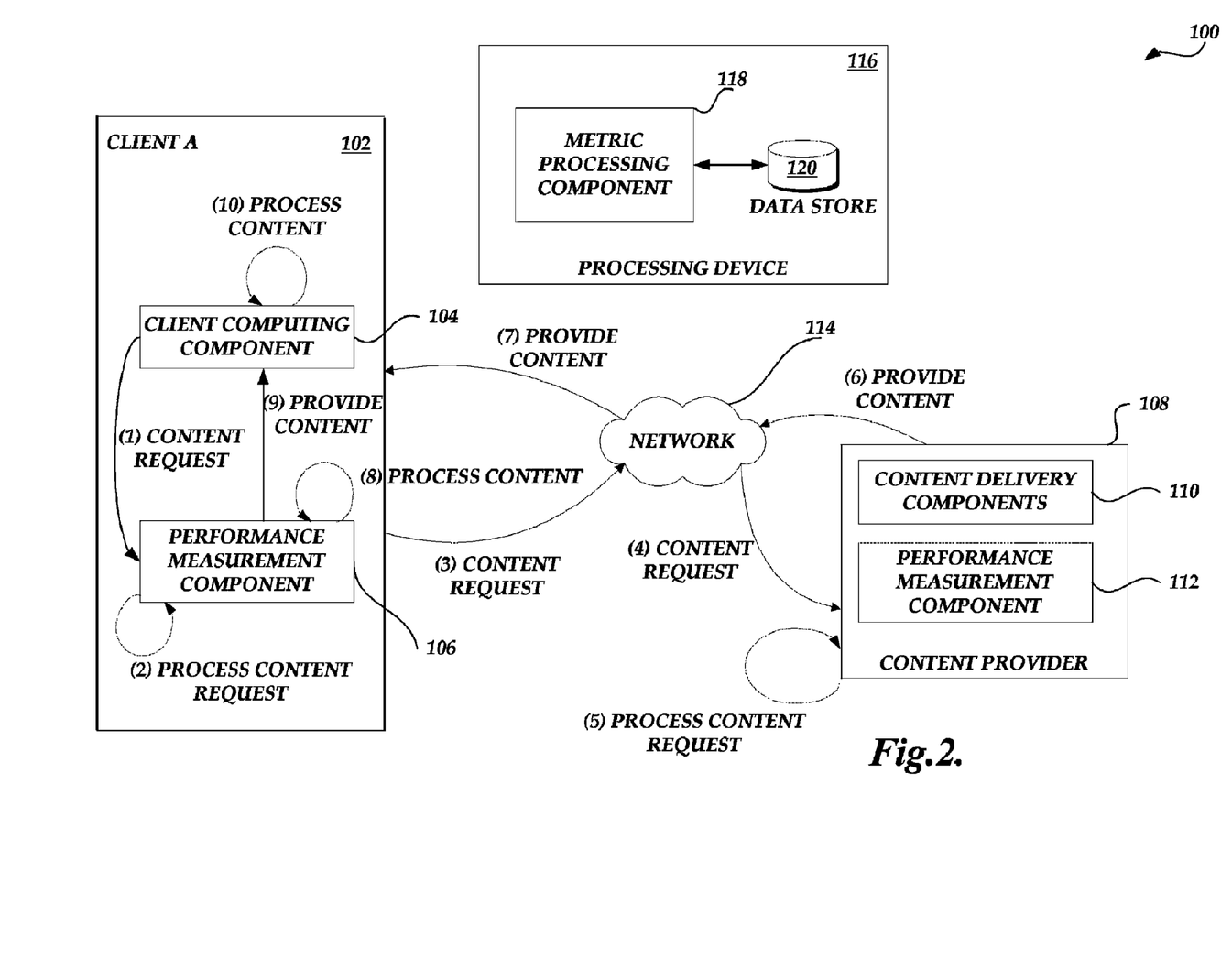
FIG. 2 is a block diagram of the performance measurement system of FIG. 1 illustrating the process of monitoring and fulfilling content requests.
Figure 3:
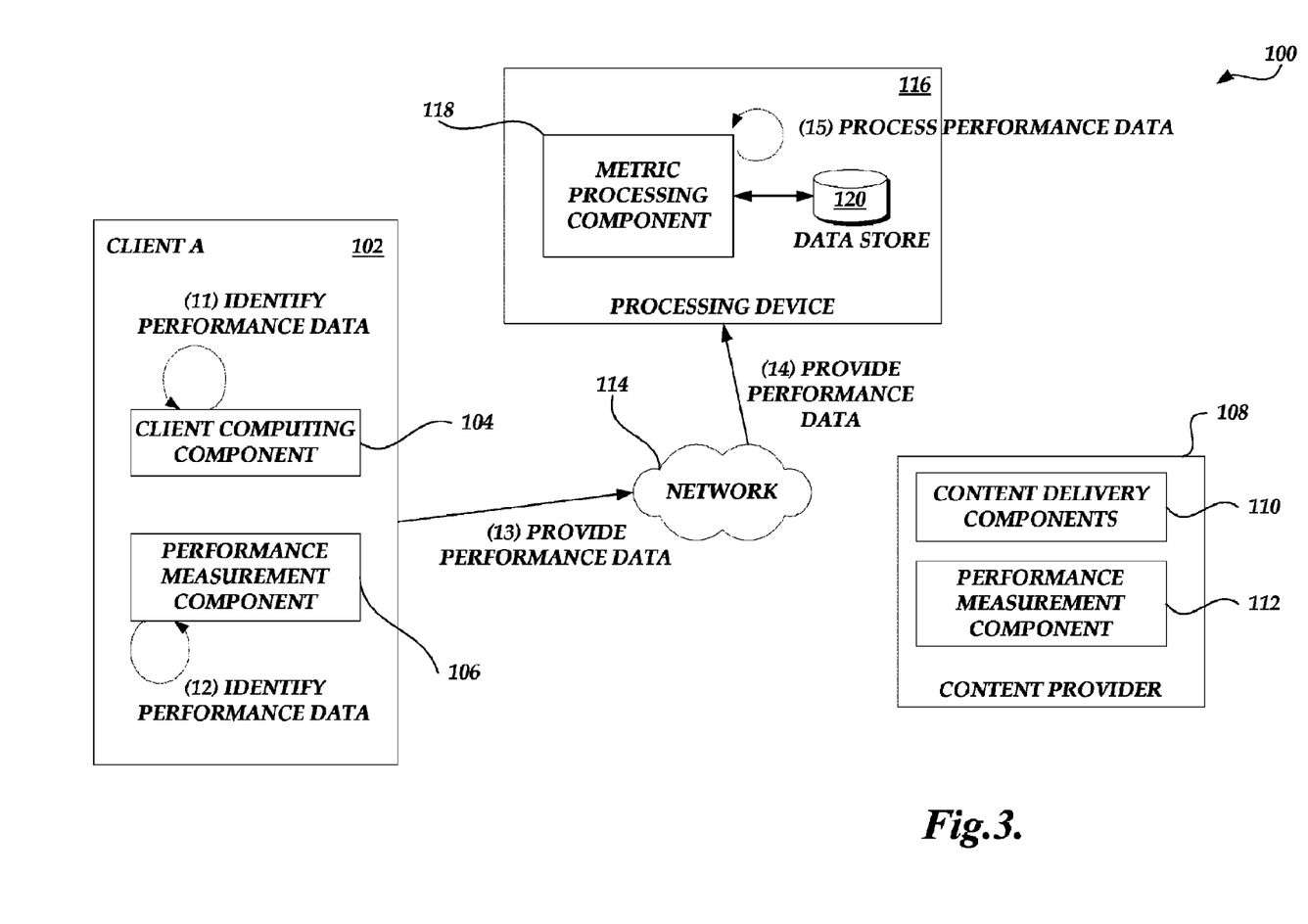
FIG. 3 is a block diagram of the performance measurement system of FIG. 1 illustrating the process of identifying and providing performance metric information from a client computing device.
Figure 4:
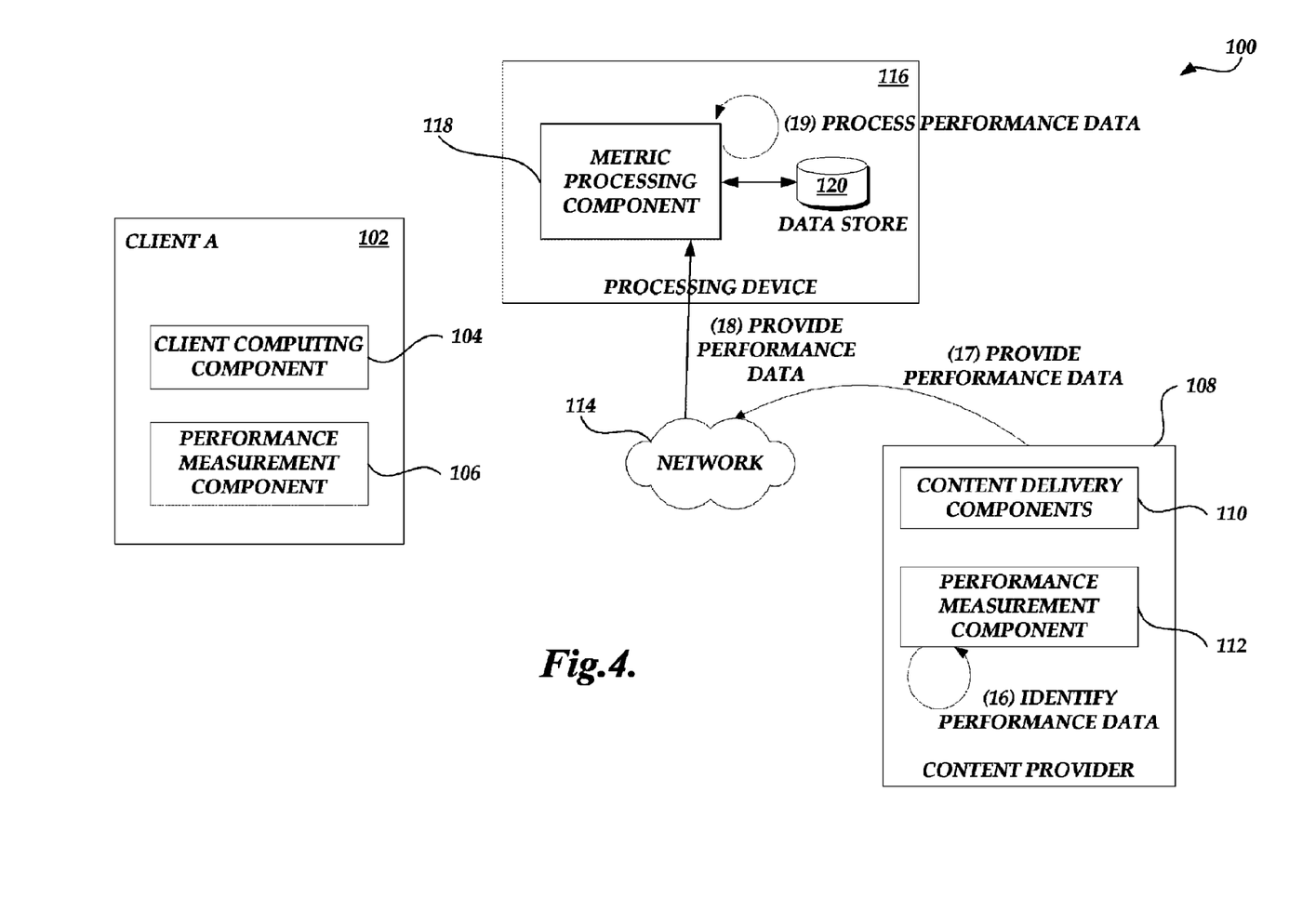
FIG. 4 is a block diagram of the performance measurement system of FIG. 1 illustrating the process of identifying and providing performance metric information from a content provider.

With reference now to FIGS. 2-4, an illustrative example of the operation of the performance measurement system 100 according to some embodiments will be described. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

With reference to FIG. 2, a client computing component 104 initiates a content request that is intended to ultimately be received and processed by the content provider 108. In an illustrative embodiment, the requested content can correspond to a Web page that is displayed on the client computing device 102 via the processing of a base set of information, such as hypertext markup language ("HTML"), extensible markup language ("XML"), and the like. The base set of information can also include a number of embedded resource identifiers that corresponds to resource objects that should be obtained by the client computing device 102 as part of the processing of the requested content. The embedded resource identifiers can be generally referred to as resource identifiers or resource URLs. The request for the base set of information and the subsequent request(s) for any embedded resources can be referred to generally as a "resource request."

In one embodiment, prior to initiating a resource request, the client computing component 104 associates a record identifier with the resource request. As will be described further below, the record identifier can be used to track performance metrics associated with processing the requested resource and any embedded resources. In one example, the record identifier may be attached to the resource request as a header or otherwise embedded in the request. The client computing component 104 then transmits the resource request with the record identifier. However, as will also be described further below, the client computing component 104 can alternatively transmit the associated record identifier in a separate transmission from the resource request.

It will be appreciated by one skilled in the relevant art and others that the client computing component 104 can generate the resource request and associated record identifier itself or receive one or the other or both from another storage or computing device. For example, another computing device, such as processing device 116, can be used to determine whether a test to monitor performance metrics associated with processing a particular resource, such as a Web page, should be conducted. In this example, the processing device 116 can send the test request, which includes a resource identifier corresponding to the desired resource request and a record identifier further associated with the resource identifier, to the client computing device 102.

In one illustrative embodiment, as shown in FIG. 2, the client computing component 104 initiates the content request by transmitting the resource identifier and associated record identifier directly or indirectly to the performance measurement component 106 of the client computing device 102. However, it will be appreciated by one skilled in the relevant art that, in the alternative, the performance measurement component 106 can otherwise intercept the content request initiated by the client computing component 104.

Continuing with the present example and in further reference to FIG. 2, the performance measurement component 106 receives the resource request and forwards the resource request on to the content provider 108 via communication network 114. Thereafter, the performance measurement component 106 continually monitors performance metrics associated with the processing of the requested resource, including any embedded resources. Specifically, in one illustrative embodiment, the performance measurement component 106 monitors network level performance metrics associated with the processing of the requested resource and any embedded resources, such as timing of receipt of the first and last bytes (or packets) of data of each request. The performance measurement component 106 can either obtain such performance metric information directly from the operating system of the client computing device 102 or through the client computing component 104. The performance measurement component 106 associates the monitored performance metrics with the record identifier.

As further illustrated in FIG. 2, the content provider 108 receives the resource request from the client computing device 102 and processes the resource request using content delivery components 110, such as a Web server. The content provider 108 can also use a performance measurement component 112 to monitor performance metrics associated with processing the incoming client request, identifying/obtaining the requested resource, and initiating the transmission of the resource responsive to the client request. As shown in FIG. 2, upon obtaining the requested resource, the content provider 108 initiates transmission of the requested resource to the client computing device 102.

In this illustrative example, the performance measurement component 106 at the client computing device 102 obtains the requested resource, continues monitoring the processing of the requested resource, and forwards the requested resource to the client computing component 104. For example, the performance measurement component 106 may serve as a proxy application for receiving the requested resource or otherwise intercepting the requested resource. The client computing component 104 also tracks performance metrics associated with the processing of the requested resource. Upon receipt of the requested resource, the client computing component 104 begins processing the content for display, execution, or storage on a resource associated with the client computing device 102. This processing may include all or some of, for example, rendering into a frame buffer or other memory, displaying on a local or remote display device, execution on a virtual machine, and so forth. As will be further described below, the above described functions apply to the processing of the originally requested resource, as well as any embedded resources.

With reference now to FIG. 3, the client computing component 104 and the performance measurement component 106 of the client computing device 102 can each identify performance metric information that the respective components have monitored and/or collected. The performance metric information from the client computing component 104 can include a variety of information, such as process information, memory information, network data, resource data, client computing component information, including page setups, browser rendering information, state variables, and other types of information. In one specific example, the performance metric information can include information regarding a time at which a particular resource was rendered on a Web page, its location on the page, whether the resource was rendered on the device display, and the like. The performance metric information from the performance measurement component 106 of the client computing device 102 can also include a variety of information. In one specific example, the performance metric data can include network statistics, latencies, bandwidths, and data arrival times, such as the timing of receipt of first and last packets of information for the requested resource and each embedded resource. In another specific example, the performance metric information can include timing information associated with processing executable resources, such as JavaScript, as well as additional information that can be used to indirectly determine processing times associated with the execution of the resource once the executable code has been obtained.

The performance metric information from the client computing component 104 and/or the performance measurement component 106 of the client computing device 102 can also include basic resource information, such as an identification of the resource type, a link to a header associated with the requested resource, a size of the resource, and the like. Even further, the performance metric information can include underlying computer resource information, such as a resolution of the display of the client computing device 102, a version of the browser application software, an identification of any plugins associated with the browser application software, an identification of any updates to the operating system of the client computing device 102, and the like.

With continued reference to FIG. 3, the client computing component 104 and the performance measurement component 106 of the client computing device 100 provide the identified performance metric information together with the associated record identifier of the requested resource to the metric processing component 118 of the processing device 116 via the communication network 114. The metric processing component 118 then processes the received performance metric information to assess performance related to the processing of the client request for the original resource and any embedded resources. The processed performance metric information can be used to support modifications to the original resource and/or embedded resources to improve performance for subsequent client requests for the original resource. As will be appreciated by one skilled in the art and others, the processing device 116 can store the received and/or processed performance metric information in local data store 120, or any other data store distributed across the network 114. Additionally, as will be further described below in reference to FIG. 7, the processing device 116 can cause the display of the processed performance metric information to a user of the system for further assessment.

In one illustrative embodiment, once the client computing component 104 completes processing of the requested resource and any embedded resources, the client computing component 104 identifies performance metric information that the client computing component 104 monitored and/or otherwise collected related to such processing. In this example, the client computing component 104 provides the identified performance metric information with the record identifier associated with the requested resource to the metric processing component 118. Upon receipt of this information, the metric processing component 118 then requests any further performance metric information related to the requested resource and any embedded resources from the performance measurement component 106 of the client computing device 102. In response, the performance measurement component 106 of the client computing device 102 identifies and provides performance metric information with the record identifier associated with the requested resource to the metric processing component 118. The metric processing component 118 can use the record identifier to aggregate the received performance metric information. It will be appreciated by one skilled in the art and others that the identified performance metric information can be transmitted to the metric processing component 118 by a number of alternative methodologies and/or components.

With reference now to FIG. 4, in one illustrative embodiment, the performance measurement component 112 of the content provider 108 can identify performance metric information that it has collected related to the processing of the requested resource and/or any embedded resource. The performance measurement component 112 provides the identified performance metric information to the metric processing component 118 of the processing device 116 via communication network 114. As will be appreciated by one skilled in the art and others, the performance measurement component 112 of the content provider 108 can provide the performance metric information upon request from the processing device 116 or upon completing its processing of the requested resource. As will be described further below, the processing device 116 can then aggregate the performance metric information from all components for displaying, processing, storing, or otherwise assessing performance related to the processing of the requested resource.

Figure 5:
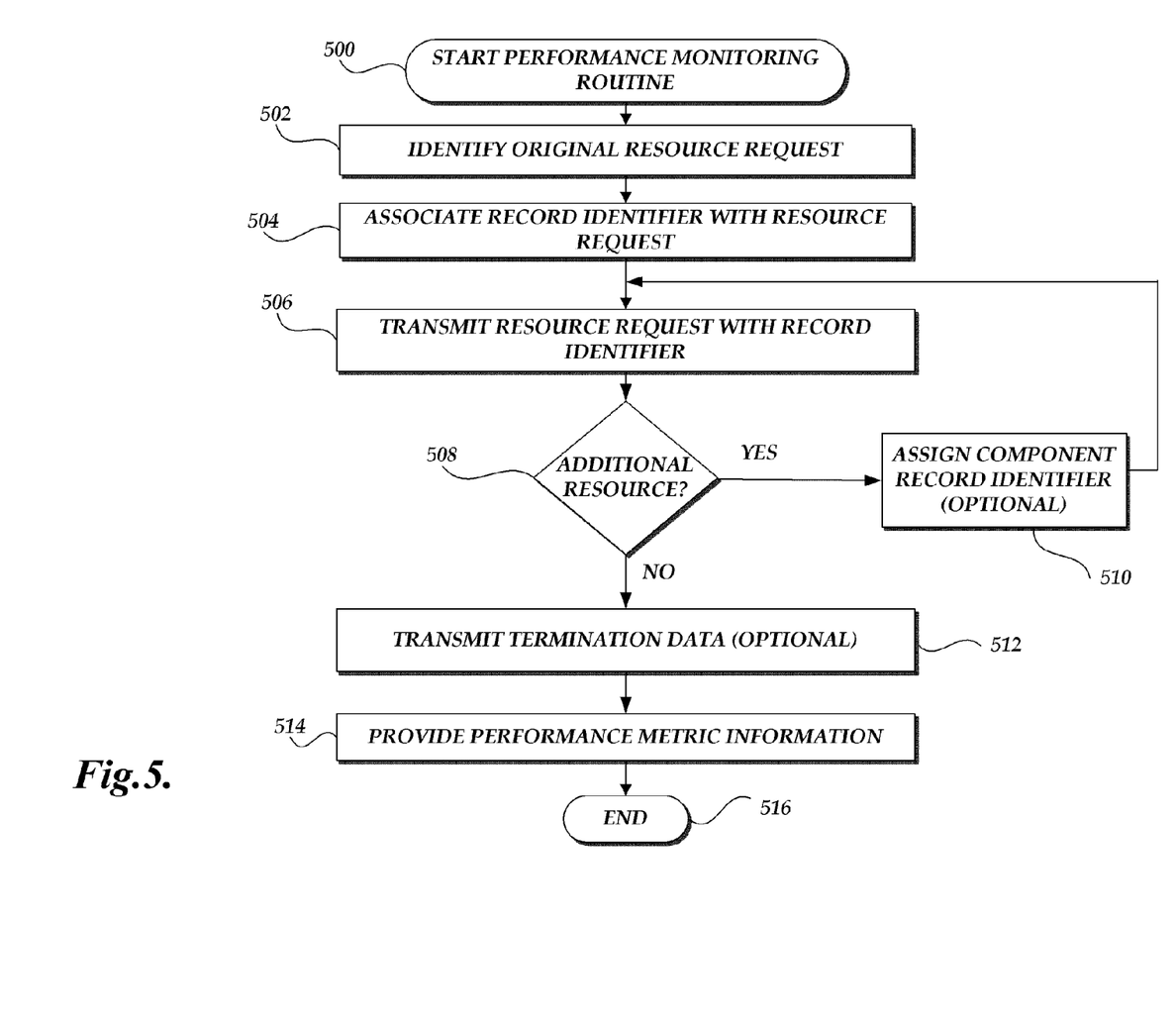
FIG. 5 is a flowchart illustrative of a performance monitoring routine implemented by a client computing device for monitoring the performance associated with resource requests made by the client computing device.

With reference now to FIG. 5, one embodiment of a performance monitoring routine 500 implemented by the client computing component 104 of the client computing device 102 will be described. One skilled in the relevant art will appreciate that actions/steps outlined for routine 500 may be implemented by one or many computing devices/components that are associated with the client computing device 102. Accordingly, routine 500 has been logically associated as being generally performed by the client computing device 102, and thus the following illustrative embodiments should not be construed as limiting.

At block 502, a client computing component 104 identifies an original resource request. As previously mentioned, the client computing component 104 can generate the original resource request or receive the original resource request from another computing device, such as processing device 116. In one example, the original resource request can be for a Web page, such as http://example.com. At block 504, the client computing component 104 associates a record identifier (RID) with the original resource request. The RID may be a unique identifier associated with the original resource request. As will be further described below, the RID can also be associated with any embedded resources included in a response to the original resource request. Even further, although not illustrated, in an alternative embodiment, in the event that the client computing component 104 does not need a RID, the client computing component 104 may not associate a RID with the resource request at shown at block 504.

At block 506, the resource request is transmitted to another entity. In this example, the resource request is transmitted to the performance measurement component 106 of the client computing device 102. As previously mentioned, the performance measurement component 106 can alternatively intercept the transmission request as it is being routed to a content provider 108 for example. In one illustrative embodiment, the resource request may itself contain the RID, such that the resource request and associated RID are transmitted as part of the same transmission. For example, the RID can be included as a portion of the resource URL used to request the resource. Alternatively or additionally, the RID may be transmitted in a second communication, either before or after the transmission including the resource request. For example, a "start new request group" command, including the RID may be issued before or after the initial resource request. In one further alternative embodiment, the client computing component 104 may not include a RID with the issuance of a "start new request group" command, and in this case, the performance measurement component 106 may generate, or otherwise obtain, such a RID upon receipt of the "start new request group" command.

Continuing at block 508, a determination is made at the client computing component 104 regarding whether any additional resources need to be requested to fulfill the original resource request. As appreciated by one skilled in the relevant art, a response to the original resource request can be returned to the client computing component 104 which includes a number of resource URLs corresponding to a number of embedded resources required to fulfill the original resource request. In one embodiment, if such additional resources are identified, processing returns to block 506 where the client computing component 104 transmits one or more requests for the identified embedded resources with the RID associated with the original resource request.

Alternatively or additionally, the client computing component 104 can assign a component record identifier (CRID) to each request for an embedded resource at optional block 510. In this example, when processing returns to block 506, the client computing component 104 can transmit the one or more embedded resource requests with the respectively assigned CRIDs. In an illustrative embodiment, the requests for embedded resources can be transmitted with respective CRIDs alone or together with the RID of the original resource request. As embedded resource requests (or component requests) are fulfilled, the returned content is processed by the client computing component 101. It will be appreciated by those skilled in the art and others that a response to an embedded resource request can include links to further embedded resources. As such, the functionality associated with blocks 506-510 may be repeated as described above until no resource requests are outstanding and no more additional resources need to be requested.

It will be appreciated by one skilled in the relevant art that resource requests are processed by the client computing device 100 in accordance with logic associated with the particular configuration of the browser software application. For example, the browser software application may be limited by a number of resource requests that can be made at one time, an order associated with the type of requests that can be made, an order based on a predetermined location for the requested resources on a display screen, or other limitations provided in the requested base resource.

Once the client computing component 104 determines at block 508 that no additional resources need to be obtained to fulfill the original resource request or any subsequent embedded resource request, processing can continue at optional block 512. At block 512, a termination command, such as "end new request group", may be transmitted to indicate that the request, including requests for all embedded resources, has completed. Such a termination command may provide closure to a "start new request group" command, if one were issued as part of the first iteration of block 506. In this example, the start/termination commands can be received and used by the performance measurement component 106 to determine which requested resources are associated with a particular originally requested resource.

At block 514, once the client computing component 104 has completed processing the requested original resource and any embedded resources, the client computing component 104 provides monitored performance metric information to processing device 116. The client computing component 104 monitors such performance metric information throughout the processing of the original resource request from initiation of the original resource request to final rendering of the requested resource and any embedded resources. The performance metric information can include, for example, timing data associated with the initiation of each request, receipt of a response to each request, and rendering of each requested resource, as well as other information as described herein. The routine 500 ends at block 516.

Figure 6:
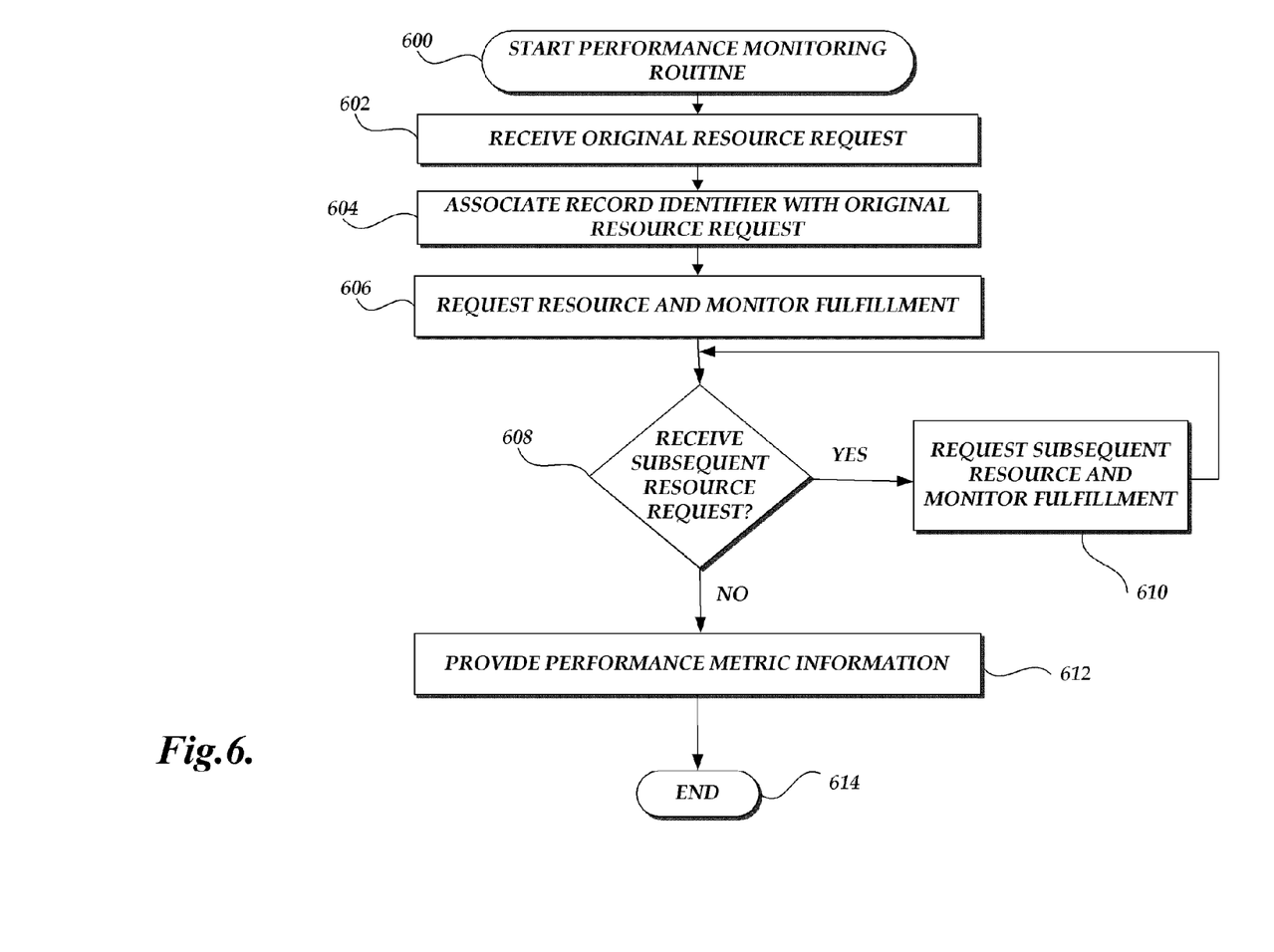
FIG. 6 is a flowchart illustrative of a performance monitoring routine implemented by a performance measurement component for further monitoring client side performance associated with resource requests made by the client computing device.

With reference now to FIG. 6, one embodiment of a performance monitoring routine 600 implemented by the performance measurement component 106 of the client computing device 102 will be described. One skilled in the relevant art will appreciate that actions/steps outlined for routine 600 may be implemented by one or many computing devices/components that are associated with the client computing device 102. Accordingly, routine 600 has been logically associated as being generally performed by the client computing device 102, and thus the following illustrative embodiments should not be construed as limiting.

At block 602, the performance measurement component 106 of the client computing component 102 receives (or intercepts) an original resource request from the client computing component 104. In one illustrative embodiment, the performance measurement component 106 receives the RID with the original resource request. Alternatively, the RID can be provided as a part of a separate transmission, and accordingly, in this case, the performance measurement component 106 receives the RID separately. At block 604, the performance measurement component 106 associates the RID with the original resource request. In accordance with other embodiments discussed above, the original resource request may be preceded or followed by a command or instructions, such as a "start new request group" command. Such commands may be transmitted with or without a RID, as set forth above. If such commands are received at the performance measurement component 106 without a RID, the performance measurement component can generate, or otherwise obtain, a RID to associate the original resource request at block 604.

Continuing at block 606, the original resource may be requested, such as by proxying or forwarding the resource request to the content provider 108 via network 114. The resource request may be modified from its original form before sending, such as by stripping headers including the associated RID. The performance measurement component 106 also monitors the processing, including fulfillment, of the resource request at block 606. For example, the performance measurement component can identify performance metric information related to the initiation of the resource request, the receipt of first and last bytes of data for each requested resource and any embedded resources, the receipt of responsive content, and the like. As will be appreciated by one skilled in the relevant art, once a response to the resource request is received at the performance measurement component 106, the response is returned to the requesting application.

At block 608, a determination is made by the performance measurement component 106 regarding whether a subsequent resource request related to the original resource request has been made by the client computing component 104 and accordingly received (or intercepted) by the performance measurement component. If a subsequent embedded resource request (which may bear the same RID as the original resource request, an appropriate CRID, and/or be within a start/stop command window) is received, processing continues at block 610. At block 610, the performance measurement component 106 requests any embedded resources and monitors the processing of the requested embedded resources as similarly described above in reference to the originally requested resource and block 606. The functionality associated with blocks 608-610 may be repeated as described above until no resource requests are outstanding.

If the performance measurement component 106 determines that no more outstanding resource requests remain at block 608, processing continues at block 612. Specifically, the performance measurement component 106 provides monitored performance metric information to processing device 116. The performance measurement component 102 monitors such performance metric information throughout the processing of the original resource request, from initiation of the original resource request to final rendering of the requested resource and any embedded resources. The performance metric information can include, for example, timing data associated with the initiation of each request, receipt of a response to each request, and receipt of first and last packets of data for each of the original resource request and any embedded resource requests, as well as other additional information as described herein.

In one illustrative embodiment, the performance measurement component 106 can identify performance metric information for providing to the processing device 116 in a variety of ways. For example, in one embodiment, the performance measurement component 106 can store performance measurement information in a log file together with identifiers to associate performance metric information with corresponding resource requests. In this example a set of requested resources may be joined by common RIDs, common CRIDs, associated CRID (e.g., where each component has a distinct CRID, but the distinct CRIDs of a single group have been associated or otherwise linked together, such as by a RID). In another illustrative embodiment, the performance measurement component can retrieve performance metric information from a log file based on timing information associated with a resource request. For example, a set of requested resources may be defined as the resources requested or fulfilled between a start command and an end command, or between an original resource request (inclusive) and a stop command. The routine 600 ends at block 614.

Figure 7:
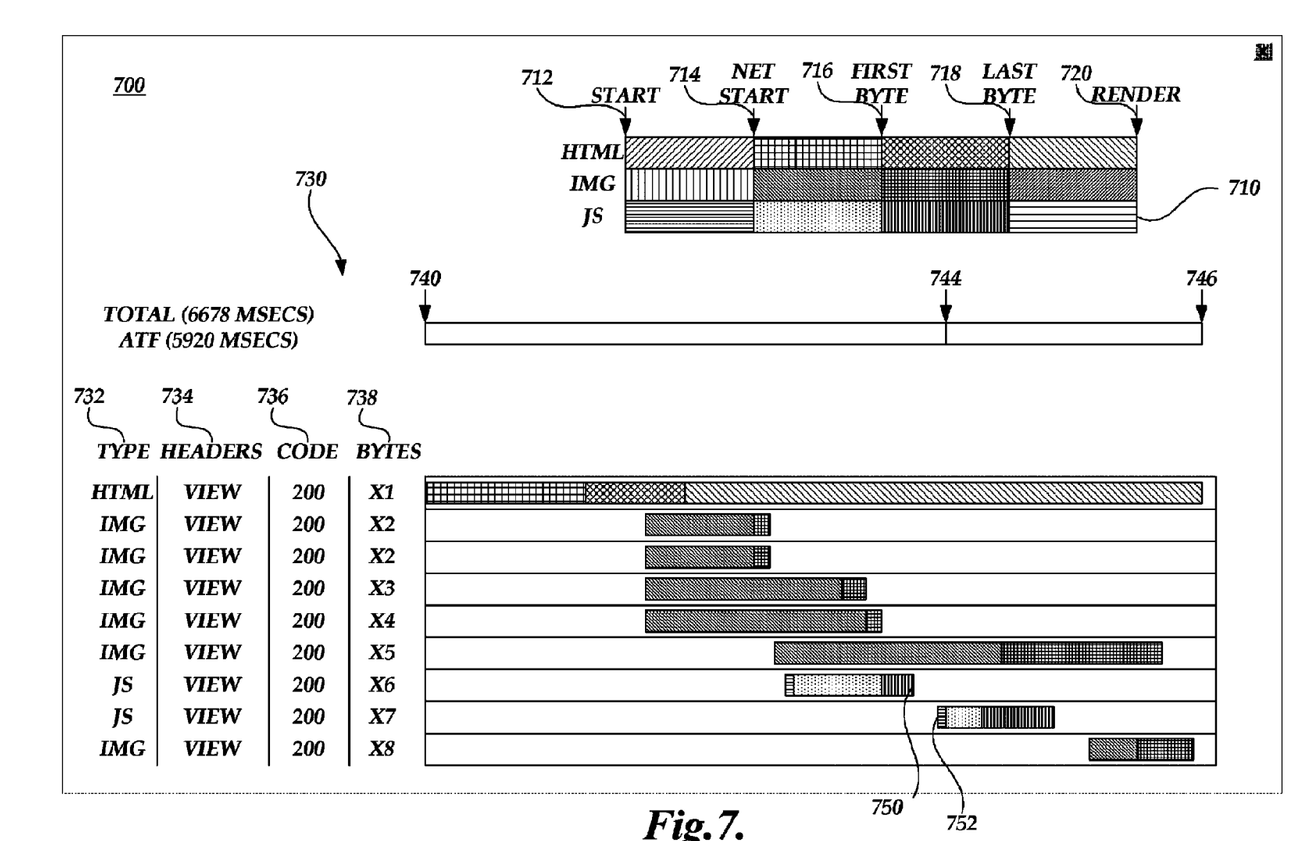
FIG. 7 is an illustrative user interface displaying a variety of performance metric information collected by the performance measurement system of FIG. 1.

With reference now to FIG. 7, an illustrative user interface 700 generated by the processing device 116 for displaying a variety of performance metric information collected, or otherwise identified, by the performance measurement system of FIG. 1 will be described. Generally, the user interface 700 shown in FIG. 7 provides a graphical side-by-side comparison of the performance metric information identified for the originally requested resource and some or all requested embedded resources. The user interface 700 may also be provided over the network 114 for display on other computing devices.

With reference to FIG. 7, the user interface 700 may be utilized to display a set of time-based events for a set of resources. For example, the user interface 700 may graphically represent an order of time-based events for an originally requested resource and for each subsequent request for embedded resources. More specifically, the user interface 700 includes a legend 710 identifying, for a number of resource types, a graphical indicator corresponding to a number of time-based events 712, 714, 716, 718, and 720 involved in processing a request for the resource. The resource types identified in the legend 710 include HTML resources, image (IMG) resources, and JavaScript (JS) resources. However, it will be appreciated that a number of alternative or additional resource types can be identified. For each resource type, the legend 710 provides a distinct indicator corresponding to a transition period and/or transition event(s) occurring between each identified event 712, 714, 716, 718, and 720. In one embodiment, the distinct indicators may be visual in nature, such as color-coded, cross-hatched, or the like. In another embodiment, instead of using a distinct indicator for each transition period and/or transition event(s) associated with each resource type as illustrated in FIG. 7, a distinct indicator may be used simply for each transition period and/or transition event(s) regardless of the resource type.

In an illustrative embodiment, events 712, 714, 716, 718, and 720 correspond to the following time-based events identified by the performance metric information. Event 712 identifies a Start Event representing a time at which the corresponding resource was known to be required by the client computing component 104. Event 714 identifies a NetStart Event representing a time at which the corresponding resource was actually requested by the client computing component 104. The timing of the NetStart Event may not be the same as the Start Event if, for example, the browser software application limits the number of concurrent connections with a particular domain. Event 716 identifies a First Byte Event representing a time at which the first byte (or first packet) of the requested resource is received by the performance measurement component 106 of the client computing device 102. Event 718 identifies a Last Byte Event representing a time at which the last byte (or last packet) of the requested resource is received by the performance measurement component 106 of the client computing device 102. Finally, event 720 identifies a Render Event representing a time at which the client computing component 104 finishes rendering the requested resource.

A second portion 730 of the user interface 700 corresponds to a representation illustrating the occurrence of each of the time-based events 712, 714, 716, 718, and 720 for all or some of the resources requested in resolving the original resource request. In one embodiment, the representation horizontally corresponds to time and vertically corresponds to an ordered listing of the requested resources. In one example, the order can specifically correspond to an order in which the requested resources are initially identified by the client computing component 104. In addition, the second portion 730 of the display includes a variety of additional information adjacent to the time-based event representation for each resource. For example, in a first column 732, a resource type for each resource may be provided, e.g., HTML, image, CSS, JavaScript, and the like. In a second column 734, a link to a header corresponding to each requested resource may be provided. In a third column 736, an HTTP response status code corresponding to each requested resource can be provided. Code 200, for example, is indicative of a standard response for successful HTTP requests. Finally, in a fourth column 738, the size of each resource can be provided.

In another embodiment, yet further additional information may be displayed in the user interface 700. For example, the user interface 700 may display the total processing time, both numerically and graphically, associated with processing the original resource request including any embedded resource requests. In this example, an indicator 740 may illustrate a starting time while an indicator 746 may illustrate an ending time, both associated with the processing of the original resource request as a whole. Additionally, when the original resource request is a request for a Web page, the user interface 700 may illustrate a time, both numerically and graphically, at which all resources have been rendered in a portion of a Web page which is initially visible to a user without scrolling. This portion of the Web page is often referred as an "above the fold," "above the scroll," or "above the crease" portion. An indicator 744 in the user interface 700 of FIG. 7 illustrates an "above the fold" (ATF) event.

The foregoing performance metric information provided in the user interface 700 may be identified and/or collected by a combination of the client computing component 104 and/or the performance measurement component 106 of the client computing device 102. However, it will be appreciated by those skilled in the art and others that additional performance metric information can be displayed. Such additionally displayed performance metric information can be obtained by the client computing device 102, by the performance measurement component 112 of the content provider 108, or based on further processing of any of the identified and/or collected performance metric information. It will also be appreciated by one skilled in the relevant art that each resource and/or each type of resource may be associated with all or only a portion of the above-described events and/or performance metric information. In addition, other events and/or indicators associated with the other events may be used and illustrated in the user interface 700.

In one specific example, an executable resource, such as a JavaScript resource, is not rendered and, accordingly, neither a Render Event 720 nor an associated indicator illustrating the transition between a Last Byte Event 718 and a Render Event 720 will be illustrated in the user interface 700 for that executable resource. However, the processing device 116 can indirectly determine and display a processing time associated with execution of the code once the code itself is obtained (i.e., receipt of the last byte of the code which corresponds to the Last Byte Event 718). Such processing time is inferred in the user interface 700 of FIG. 7 by illustration of a gap formed between the receipt of the last byte of code associated with a first JavaScript resource at 750 and the start event associated with a subsequently requested JavaScript resource at 752. Alternatively, an additional event and/or associated indicator could be used to specifically identify the processing time associated with execution of the code.

By providing and displaying the foregoing performance metric information as set forth above, a user of the processing device 116 can readily evaluate the performance associated with processing the originally requested resource, including any embedded resources. In particular, the user interface 700 can help a user identify any problems associated with the processing of the originally requested resource, as well as determine one or more solutions to the identified problem. Solutions for improving performance may include, for example, making changes to the content itself, to the organization of content within the originally requested resource, to the client computing component, and the like.

It will be appreciated by those skilled in the art and others that while processing and monitoring functions have been described herein as being performed at various components of the client computing device, these functions can be distributed across one or more computing devices. In addition, the performance metric information monitored at the client computing device can be maintained globally by the client computing device and shared with all or some subset of the components of the client computing device.

It will further be appreciated by those skilled in the art and others that all of the functions described in this disclosure may be embodied in software executed by one or more processors of the disclosed components. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:
a client computing device comprising a client computing component, wherein the client computing component is operable to:
identify an original resource request, wherein the original resource request includes an original resource identifier;
associate a record identifier with the original resource request;
transmit the original resource request and the record identifier;
receive a response to the original resource request;
identify an embedded resource identifier in the response to the original resource request;
assign a component record identifier to the embedded resource identifier, wherein the component record identifier is different from the record identifier;
determine performance data associated with processing the original resource request; and
transmit, to a processing component, the performance data associated with the record identifier; and
a performance measurement component associated with the client computing device, wherein the performance measurement component is operable to:
receive the original resource request and the record identifier from the client computing component;
transmit the original resource request;
receive a response to the original resource request;
determine performance data associated with processing the original resource request;
determine performance data associated with processing the embedded resource request included in the response to the original resource request, wherein the performance data associated with processing the embedded resource request includes a start and end processing time for the embedded resource request; and transmit, to the processing component, the determined performance data associated with processing the original resource request and the embedded resource request, the determined performance data associated with the record identifier.

2. The system of claim 1, wherein associating a record identifier with the original resource request, by the client computing component, comprises generating a record identifier for the original resource request.

3. The system of claim 1, wherein the original resource identifier is a uniform resource locator.

4. The system of claim 1, wherein the performance data determined by the client computing component includes timing information regarding initiation of the original resource request.

5. The system of claim 1, wherein the performance data determined by the client computing component includes timing information regarding fulfillment of the original resource request at the client computing device.

6. The system of claim 1, wherein the original resource request and the record identifier are transmitted by the client computing component in the same transmission.

7. The system of claim 1, wherein transmitting the original resource request and the record identifier by the client computing component comprises transmitting the original resource request in a first transmission and the record identifier in a second transmission, wherein the second transmission is indicative of commencement of the original resource request and wherein the second transmission is different from the first transmission.

8. The system of claim 7, wherein the client computing component is further operable to transmit, to the performance measurement component, a notice regarding completion of rendering the content associated with the original resource request.

9. The system of claim 1, wherein the client computing component is further operable to transmit, to the performance measurement component, a notice regarding completion of rendering the content associated with the original resource request.

10. The system of claim 1, wherein the client computing component is further operable to transmit, to the performance measurement component, both a request for the embedded resource and the component record identifier.

11. The system of claim 10, wherein the client computing component is further operable to:
determine performance data associated with processing of the embedded resource request; and
transmit, to the processing component, the performance data associated with the embedded resource request together with the component record identifier.

12. The system of claim 11, wherein the performance data associated with the embedded resource request includes timing information regarding initiation of the embedded resource request.

13. The system of claim 11, wherein the performance data determined by the client computing component and associated with the embedded resource request includes timing information regarding fulfillment of the embedded resource request at the client computing device.

14. The system of claim 1, wherein the client computing component is a browser application.

15. The system of claim 1, wherein the client computing component is a plugin.

16. The system of claim 1, wherein the performance measurement component is a proxy application.

17. The system of claim 1, wherein the client computing component and the performance measurement component are both executed at the client computing device.

18. The system of claim 1 further comprising the processing component, wherein the processing component is operable to:
obtain, from the client computing component, the performance data associated with processing the original resource request, the performance data further associated with the record identifier;
obtain, from the performance measurement component, performance data associated with processing the original resource request and each embedded resource request, the performance data further associated with the record identifier; and
associate the performance data from the client computing component and the performance data from the performance measurement component using the record identifier.

19. The system of claim 18, wherein the processing component is executed at the client computing device.

20. The system of claim 18, wherein the processing component is executed remotely from the client computing device.

21. A method of monitoring performance associated with an original resource request, the method comprising:
associating, at a client computing device comprising a client computing component, a record identifier with an original resource request, wherein the original resource request includes an original resource identifier;
transmitting, to a performance measurement component, the original resource request and the record identifier;
receiving, at the client computing component, a response to the original resource request;
identifying an embedded resource identifier in the response to the original resource request;
assigning a component record identifier to the embedded resource identifier, wherein the component record identifier is associated with, but different from the record identifier;
transmitting, to the performance measurement component, both a request for the embedded resource and the component record identifier;
determining, at the client computing component, performance data associated with processing the request for the original resource; and
transmitting, to a processing component, the performance data together with the record identifier,
wherein the method is implemented by the client computing device.

22. The method of claim 21 further comprising receiving, at the client computing component, an initial identification of both the original resource request and the record identifier for tracking performance data associated with the original resource request.

23. The method of claim 21, wherein associating a record identifier with the original resource request comprises generating a record identifier for the original resource request at the client computing component.

24. The method of claim 21, wherein the original resource identifier is a uniform resource locator.

25. The method of claim 21, wherein the performance data includes timing information regarding initiation of the original resource request.

26. The method of claim 21, wherein the performance data includes timing information regarding fulfillment of the original resource request at the client computing device.

27. The method of claim 21, wherein the original resource request and the record identifier are transmitted in the same transmission.

28. The method of claim 21, wherein transmitting, to the performance measurement component, the original resource request and the record identifier comprises transmitting the original resource request in a first transmission and the record identifier in a second transmission, wherein the second transmission is indicative of commencement of the original resource request and wherein the second transmission is different from the first transmission.

29. The method of claim 28 further comprising transmitting, to the performance measurement component, a notice regarding completion of rendering the content associated with the original resource request.

30. The method of claim 21 further comprising transmitting, to the performance measurement component, a notice regarding completion of rendering the content associated with the original resource request.

31. The method of claim 21 further comprising:
   determining, at the client computing component, performance data associated with processing the embedded resource request; and
   transmitting, to the processing component, the performance data associated with processing the embedded resource request together with the corresponding component record identifier for the embedded resource request.

32. The method of claim 31, wherein the performance data associated with the embedded resource request includes timing information regarding initiation of the embedded resource request.

33. The method of claim 31, wherein the performance data determined by the client computing component and associated with the embedded resource request includes timing information regarding fulfillment of the embedded resource request at the client computing device.

34. The method of claim 21, wherein the client computing component is a browser application.

35. The method of claim 21, wherein the client computing component is a plugin.

36. The method of claim 21, wherein the performance measurement component is a proxy application.

37. A method of monitoring performance associated with an original resource request at a performance measurement component, the method comprising:
   obtaining, from a client computing device comprising a client computing component, an original resource request associated with a record identifier, wherein the original resource request includes an original resource identifier;
   transmitting the original resource request;
   receiving a response to the original resource request;
   determining performance data associated with the original resource request;
   obtaining, from the client computing device, an embedded resource request associated with a component record identifier, wherein the embedded resource request is identified by an embedded resource identifier included in the response to the original resource request and wherein the component record identifier is associated with, but different from the record identifier corresponding to the original resource request;
   transmitting the embedded resource request;
   receiving a response to the embedded resource request;
   determining performance data associated with the embedded resource request; and
   transmitting, to a processing component, the performance data associated with the original resource request together with the record identifier.

38. The method of claim 37, wherein the performance data includes timing information associated with events pertaining to processing the original resource request.

39. The method of claim 37, wherein the performance data associated with the embedded resource request includes timing information associated with events pertaining to processing the embedded resource request.

40. The method of claim 39, wherein the events include receipt of the first byte of data and the last byte of data associated with the embedded resource request.

41. The method of claim 37 further comprising transmitting, to the processing component, the performance data associated with the embedded resource request together with the corresponding component record identifier.

42. The method of claim 37 further comprising obtaining a notice requesting commencement of monitoring the original resource request.

43. The method of claim 42 further comprising obtaining a notice identifying completion of rendering the original resource request.

44. The method of claim 43, wherein the record identifier is associated with events pertaining to the processing of the original resource request during the time between the commencement notice and the completion notice.

45. The method of claim 44, wherein the performance data includes information regarding the events.

46. The method of claim 45, wherein the events include timing of receipt of the first byte of data and last byte of data associated with each embedded resource request associated with the original resource request.

47. A method comprising:
   obtaining an original resource request, wherein the original resource request includes an original resource identifier;
   associating a record identifier with the original resource request;
   determining performance data associated with processing the original resource request;
   determining, at a client computing device, performance data associated with processing each embedded resource request included in a response to the original resource request, wherein the performance data associated with processing each embedded resource request includes a start and end processing time for each embedded resource request; and
   transmitting, from the client computing device to a different processing device, the determined performance data with the record identifier.

48. A method comprising:
   obtaining, at a processing device from a client computing device comprising a client computing component, performance data associated with a record identifier, wherein the performance data is associated with processing an original resource;
   obtaining, at the processing device from a performance measurement component, performance data associated with the record identifier, wherein the performance data is associated with processing the original resource request and wherein the performance data from the performance measurement component includes timing information as to the receipt of the first and last bytes of data for each embedded resource request included in a response to the original resource request; and
   associating, at the processing device, the performance data from the client computing component and the performance data from the performance measurement component using the record identifier.

* * * * *